Figure 1:
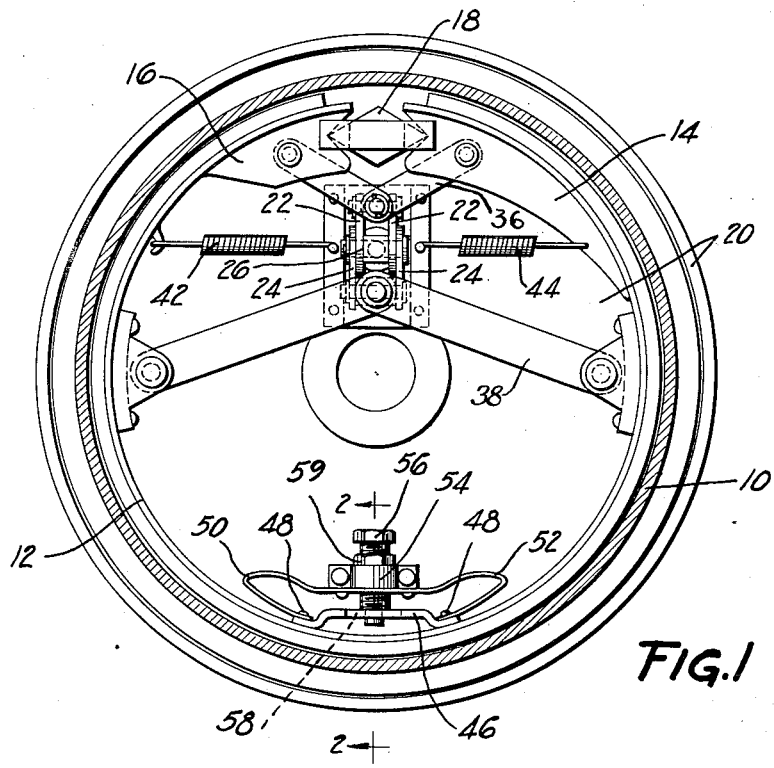

Aug. 27, 1935.   E. V. TAYLOR   2,012,644

BRAKE

Original Filed Jan. 18, 1930

*INVENTOR.*
EUGENE V. TAYLOR
BY
*ATTORNEY*

Patented Aug. 27, 1935

2,012,644

UNITED STATES PATENT OFFICE 2,012,644

BRAKE

Eugene V. Taylor, Chicago, Ill., assignor to Bendix Brake Company, South Bend, Ind., a corporation of Illinois Original application January 18, 1930, Serial No. 421,641. Divided and this application March 6, 1934, Serial No. 714,296

10 Claims. (Cl. 188—78)

This invention relates to brakes, and is illustrated as embodied in an internal expanding automobile brake of the type in which one end of the friction means anchors when the drum is turning in one direction and the other end anchors when the drum is turning in the other direction.

An object of the invention is to provide a simple and effective centering device for the part of the friction means opposite the brake anchorage, when used in the above type of brake, which preferably (1) centers the friction means when the brake is released; (2) guides the friction means circumferentially of the brake; (3) prevents lateral movement of the friction means, and (4) positions (adjustably, if desired) the friction means radially of the brake when the brake is released. Many of the advantages of the invention may be secured without utilizing all four of these functions, but an important feature relates to the design and arrangement of a single very simple and compact device for performing at least some of these functions which usually are carried out by several devices.

In the illustrated arrangement, a support adjacent the friction means (shown as a bracket carried by the backing plate) has secured thereto a leaf spring device whose ends are formed in loops and secured to the friction means, so that it urges the friction means radially inward away from the drum in the manner of a return spring, and at the same time centers the friction means circumferentially of the brake when the brake is released.

Whether the support and the friction means are yieldingly connected by the described leaf spring or by some other spring device, I prefer to mount on the support (for example by adjustably threading it therethrough) a stop which determines the released position of the friction means radially of the brake. Preferably this stop and the friction means have interengaging parts which guide the friction means circumferentially of the brake while preventing it from moving laterally.

As shown, the stop has a guide at its end projecting into a slot in a part carried by the friction means, and a shoulder which is engaged by the inner face of said part when the brake is released, to determine its radial position. I prefer to arrange this stop substantially midway between the ends of the above-described spring.

Figure 2:
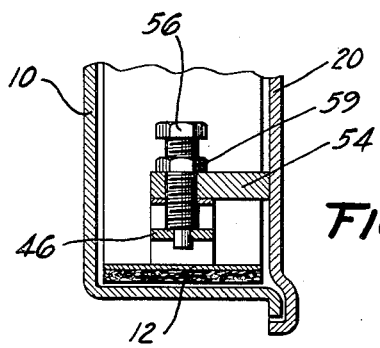

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the drum, and showing the friction means in side elevation; and Figure 2 is a partial radial section, on the line 2—2 of Figure 1, showing the mounting of the adjustable stop in the support.

The illustrated brake includes a rotatable drum 10, within which is arranged the brake friction means, shown as a lining covered steel band 12. The band may be reinforced at its ends by long and short webs 14 and 16, formed at their ends with V-shaped notches embracing a diamond-shaped anchor 18 carried by a backing plate or other support 20 arranged at the open side of the drum.

The brake is applied by means such as a vertically arranged toggle including links 22 and 24 connected by a pin 26 connected to an operating cable extending through the backing plate at right angles thereto.

The vertical toggle 22—24 is connected to the knuckles of upper and lower toggles including links 36 and 38 connected at their ends to the friction means 12. These toggles act, when straightened, to apply the brake against the resistance of return springs 42 and 44.

The above-described applying and anchorage means is more fully described, and is claimed, in my application No. 421,641, filed January 18, 1930, of which the present application is a division.

According to the present invention, one specific embodiment of which is illustrated in the drawing and described below, there is carried by the friction means 12, across the brake from the anchorage 18, a structure such as a stamping or other part 46 secured (as by screws 48) at its offset ends to the inner face of the friction means 12. The screws 48 may also be utilized to clamp the return-bent loops or C-shaped ends 50 and 52 of leaf spring means serving to center the friction means, and also to urge it radially inward, when the brake is released.

The leaf spring means 50—52 may be in the form of a single leaf spring, looped at its ends, and centrally secured to a support such as a bracket 54 bolted or otherwise rigidly secured to the backing plate 20.

The bracket 54 is shown formed at its central portion with a threaded opening adjustably receiving a stop 56, which may conveniently be a hex-headed threaded bolt provided with a locknut 59.

The lower end of the stop 56 is preferably formed with a shoulder engaging the inner face of the part 46, and with a guide or projection of lesser diameter projecting into an elongated circumferential guide slot 58 in the part 46. This guide cooperates with the slot to prevent lateral movement of the friction means 12, while permitting it to move freely circumferentially of the brake.

When the brake is applied, one or the other of the webs 14 and 16 anchors at 18, the slot 58 shifting on the projection on the bottom of the stop 56, the looped leaf springs 50 and 52 distorting accordingly. At the same time, as the band 12 expands, the part opposite the bracket 54 moves radially outward against the drum, away from the shoulder on the stop 56.

When the brake is thereafter released, the springs 50 and 52 center the slot 58 upon the projection at the end of stop 56, and at the same time urge the inner face of the part 46 against the shoulder on the part 56.

The clearance of the brake lining may readily be adjusted by turning the stop 56, after loosening the lock-nut 59.

While one illustrative embodiment has been described in detail, it is not my intention to limit the scope of the invention to that particular embodiment, or otherwise than by the terms of the appended claims.

I claim:

1. A brake having friction means, a fixed support, and leaf spring means secured to said support, and having loops at opposite sides of the support which are secured at their ends to the friction means.

2. A brake having friction means, a fixed support and a leaf spring secured at its center to said support and having integral loops at opposite sides of the support which are secured at their ends to the friction means.

3. A brake having friction means, a fixed support, leaf spring means secured to said support and having loops at opposite sides of the support which are secured at their ends to the friction means, and interengaging means on the support and the friction means and guiding the friction means to permit it to move freely circumferentially but preventing it from moving laterally.

4. A brake having friction means, a fixed support, a leaf spring secured at its center to said support and having integral loops at opposite sides of the support which are secured at their ends to the friction means, and interengaging means on the support and the friction means and guiding the friction means to permit it to move freely circumferentially but preventing it from moving laterally.

5. A brake having friction means, a fixed support, leaf spring means secured to said support and having loops at opposite sides of the support which are secured at their ends to the friction means, and interengaging means on the support and the friction means and guiding the friction means to permit it to move freely circumferentially but preventing it from moving laterally, said interengaging means also serving as a stop determining the radial position of the adjacent portion of the friction means when the brake is released.

6. A brake having friction means, a fixed support, a leaf spring secured at its center to said support and having integral loops at opposite sides of the support which are secured at their ends to the friction means, and interengaging means on the support and the friction means and guiding the friction means to permit it to move freely circumferentially but preventing it from moving laterally, said interengaging means also serving as a stop determining the radial position of the adjacent portion of the friction means when the brake is released.

7. A brake having friction means, an adjacent support, a part carried by the friction means opposite the support and formed with an elongated slot, a stop adjustably carried by the support and having a guide part extending into the slot and having a shoulder engageable with the inner face of said part to determine its released position radially of the brake, and a leaf spring centrally secured to said support and having looped ends secured to the friction means.

8. A brake having a drum, friction means having an anchorage and engaging the anchorage at one end when the drum is turning in one direction and at the other end when the drum is turning in the other direction, applying means acting on said ends adjacent the anchorage, and a leaf spring across the brake from said anchorage having its center fixed and having its ends formed in loops and secured to the friction means.

9. A brake having a drum, friction means having an anchorage and engaging the anchorage at one end when the drum is turning in one direction and at the other end when the drum is turning in the other direction, applying means acting on said ends adjacent the anchorage, a leaf spring across the brake from said anchorage having its center fixed and having its ends formed in loops and secured to the friction means, and a stop engageable with the friction means between the ends of said spring.

10. A brake having a drum, friction means having an anchorage and engaging the anchorage at one end when the drum is turning in one direction and at the other end when the drum is turning in the other direction, applying means acting on said ends adjacent the anchorage, a leaf spring across the brake from said anchorage having its center fixed and having its ends formed in loops and secured to the friction means, and a stop engageable with the friction means between the ends of said spring, said stop and the friction means having interengaging guide parts preventing lateral movement of the friction means but permitting circumferential movement thereof.

EUGENE V. TAYLOR.